(12) United States Patent
Eichholz

(10) Patent No.: US 6,428,923 B1
(45) Date of Patent: Aug. 6, 2002

(54) ACCOMMODATION FOR HOLDING AND CONNECTING BATTERIES

(75) Inventor: Heinz-Dieter Eichholz, Iserlohn (DE)

(73) Assignee: A + K Müller GmbH & Co. KG, Düsseldorf (DE)

(*) Notice: Subject to any disclaimer, the term of this patent is extended or adjusted under 35 U.S.C. 154(b) by 5 days.

(21) Appl. No.: 09/621,572

(22) Filed: Jul. 21, 2000

(30) Foreign Application Priority Data

Jul. 27, 1999 (DE) ..................................... 299 13 127 U

(51) Int. Cl.[7] ............................................... H01M 2/02
(52) U.S. Cl. ......................... 429/96; 429/151; 429/155
(58) Field of Search ............................ 429/148, 151, 429/153, 155, 159, 163, 179, 180, 96

(56) References Cited

U.S. PATENT DOCUMENTS

| | | | | |
|---|---|---|---|---|
| 3,440,105 A | * | 4/1969 | Yamamoto et al. | 429/176 |
| 4,013,818 A | * | 3/1977 | Askew et al. | 429/112 |
| 4,087,595 A | * | 5/1978 | Mallery et al. | 429/153 |
| 6,174,620 B1 | * | 1/2001 | Okada et al. | 429/176 |

* cited by examiner

Primary Examiner—Patrick Ryan
Assistant Examiner—M. Wills
(74) Attorney, Agent, or Firm—Chadbourne & Parke, LLP

(57) ABSTRACT

An accommodation for holding and connecting batteries, especially lithium batteries of the type ordinarily employed for photographic purposes, but in conditions where moisture constitutes a hazard, such as in electronically controlled plumbing fixtures. The accommodation is provided with a pocket-like envelope of elastomeric material with an inner surface that matches the outer surface of the battery to be accommodated therein and with an opening at one end to insert the battery therethrough and closed at the other end. The accommodation has a plate with resilient contacts on its inward-facing side inside the envelope at the closed end and the envelope is surrounded by an inward-extending collar in the vicinity of the open end that engages the battery from behind and secures it, forcing it against the contacts. A connecting cable extends moisture-tight out of the closed end.

4 Claims, 2 Drawing Sheets

ACCOMMODATION FOR HOLDING AND CONNECTING BATTERIES

BACKGROUND OF THE INVENTION

The present invention concerns an accommodation for holding and connecting batteries, especially lithium batteries of the type ordinarily employed for photographic purposes, but in the present case, in conditions where moisture constitutes a hazard, for example, in electronically controlled plumbing fixtures.

Although lithium batteries were initially invented for use in cameras and photoflash equipment, their high capacity makes them particularly appropriate for providing current to electronically controlled plumbing fixtures. When so employed, however, the batteries must be reliably protected from moisture.

The object of the present invention is an accommodation for holding and connecting batteries, especially lithium photographic type batteries, that will allow their use in conditions where moisture constitutes a hazard, especially in plumbing fixtures or in housings therefor.

SUMMARY OF THE INVENTION

This object is attained in accordance with the present invention in that the accommodation is provided with a pocket-like envelope of elastomeric material with an inner surface that matches the outer surface of the battery to be accommodated therein and with an opening at one end to insert the battery through and the other end closed, by a plate with resilient contacts on its inward facing side inside the envelope at the closed end, in that the envelope is surrounded by an inward-extending collar in the vicinity of the open end that engages the battery from behind and secures it, forcing it against the contacts, and by a connecting cable that extends moisture-tight out of the closed end.

It can be of particular advantage for the batteries to be asymmetric to an axis extending through their contacts, for the inner surface of the envelope to match the outer surface of the battery precisely enough to prevent a battery from being inserted rotated 180° around its longitudinal axis.

The basis theory of the present invention is to provide an envelope of elastomeric material that a battery can be inserted into through an open end such that the battery will not only be enclosed by the inner surface of the envelope but also be secured by the inward-extending collar in the vicinity of the open end and be forced against the resilient contacts inside the envelope. The envelope will nestle tight enough around the battery to seal the contacts off from ambient moisture. As will be specified hereinafter, the inner surface of the envelope can be induced to rest snug enough against the outer surface of asymmetric batteries, batteries, that is, with a cross-section that is asymmetric to an axis extending through their contacts, to ensure that the batteries can be inserted only in a specific orientation and hence correctly poled.

It can also be of particular advantage for one side of the accommodation to be provided with Velcro-type tape to facilitate mounting.

One embodiment of the present invention will now be specified with reference to the accompanying drawing, wherein:

DETAILED DESCRIPTION OF THE INVENTION

Figure 1:
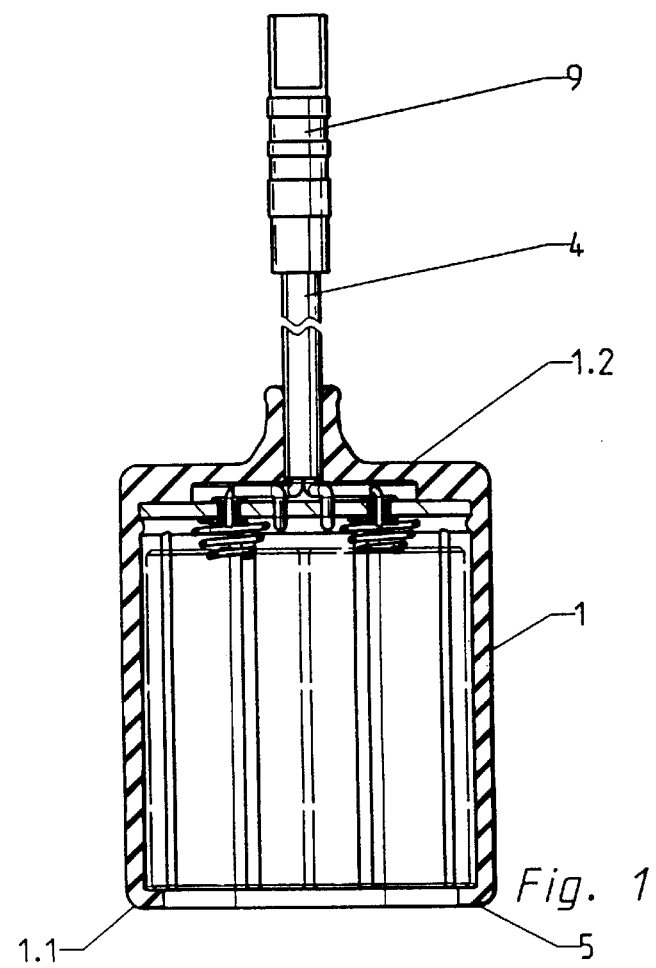
FIG. 1 is a longitudinal section through an accommodation for holding and connecting batteries according to the invention.
Figure 2:
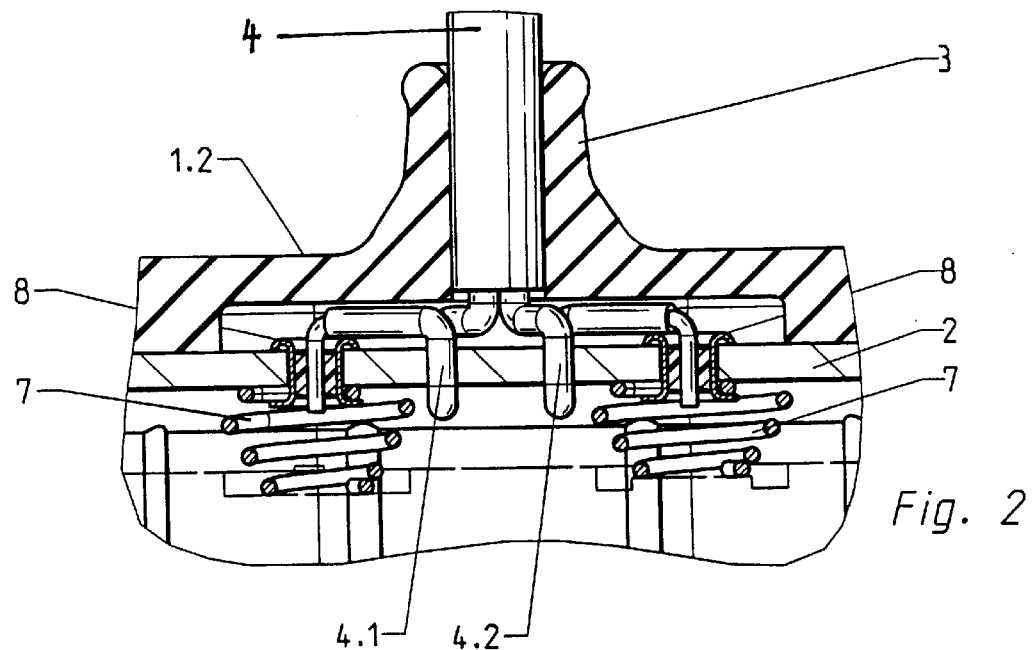
FIG. 2 is a larger-scale detail of FIG. 1.
Figure 3:
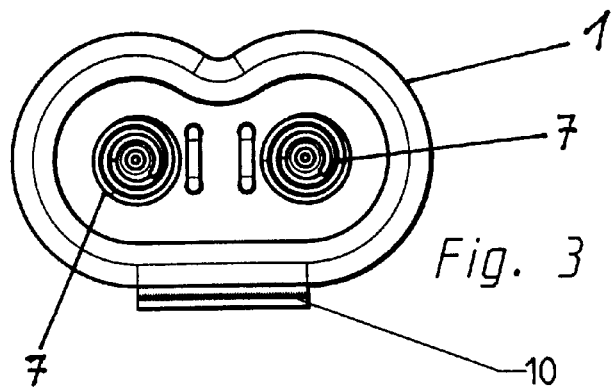
FIG. 3 is an overhead view of the open end of the accommodation illustrated in FIG. 1.
Figure 4:
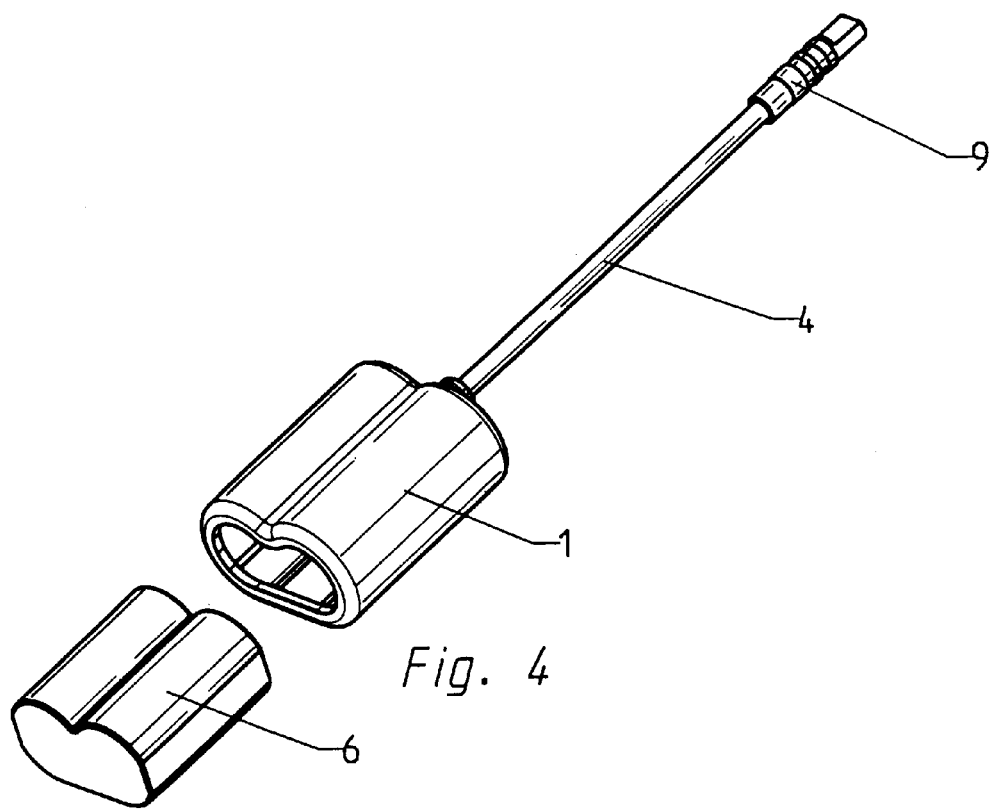
FIG. 4 is a perspective view of the accommodation illustrated in FIG. 1 along with a battery about to be inserted into it.

The accommodation for holding and connecting batteries illustrated in FIGS. 1 through 4 has a pocket-like envelope 1 of elastomeric material, its inner surface matching, as will be evident from FIGS. 3 and 4, the outer surface of a battery 6 to be accommodated therein. Battery 6 is essentially elliptical in cross-section and has a trough-like depression along one side. Envelope 1 has a battery-insertion opening 1.1 at one end, the other end being closed and constituting a base 1.2. Wedged inside envelope 1 and in the vicinity of base 1.2 is a battery-contact plate 2. Spring contacts 7 are secured by rivets 8 to the side of battery-contact plate 2 facing the inside of envelope 1. Soldered to the bases of contacts 7 are the cores 4.1 and 4.2 of a connecting cable 4. In the vicinity of its battery insertion opening 1.1, envelope 1 is surrounded by an inward-projecting collar 5 that engages the rear of a battery inserted into the envelope and secures it therein, forcing its contacts against contacts 7.

Molded onto the base 1.2 of envelope 1 is a neck 3. Connecting cable 4 extends out through neck 3, which seals it moisture-tight. At the other end of connecting cable 4 is a jack 9. Extending along the outer surface of envelope 1 is a strip 10 of Velcro-type tape that can be employed to attach the accommodation to or in a fixture. As will be evident from FIG. 4, a battery 6 that is to be inserted has a cross-section that is asymmetric to an axis extending through its contacts and a trough-like depression along one side, the other side being flat. As will be evident from FIGS. 3 and 4, the cross-section of envelope 1 closely matches that of the battery, which can be inserted into it in only one specific orientation and not rotated 180° therefrom. It will accordingly be obvious that the battery will always be inserted correctly poled.

What is claimed is:

1. An accommodation for holding and connecting batteries to protect against moisture, comprising a envelope of elastomeric material with an inner surface that matches an outer surface of the battery to be accommodated therein and with an opening at one end to insert the battery there-through and closed at the other end, a plate with resilient contacts on its inward-facing side inside the envelope at the closed end, wherein the envelope is surrounded by an inward-extending collar in the vicinity of the open end that engages the battery from behind and secures the battery, forcing the battery against the contacts, and a connecting cable that extends moisture-tight out of the closed end.

2. The accommodation as in claim 1, wherein the battery is asymmetric to an axis extending through the contacts thereof wherein the inner surface of the envelope matches the outer surface of the battery sufficiently enough to prevent a battery from being inserted rotated 180° around a longitudinal axis thereof.

3. The accommodation as in claim 1, further comprising a neck extending out of the closed end of the envelope with a connecting cable projecting moisture-tight through it and having a jack at its outer end.

4. The accommodation as in claim 1, further comprising a strip of self-adhesive hook and loop tape for attaching the envelope.

* * * * *